(12) United States Patent
Lopez et al.

(10) Patent No.: US 12,160,333 B2
(45) Date of Patent: Dec. 3, 2024

(54) AVOIDING SPECTRAL LINES FOR WAKE UP PACKET OOK SIGNAL

(71) Applicant: Telefonaktiebolaget LM Ericsson (publ), Stockholm (SE)

(72) Inventors: Miguel Lopez, Solna (SE); Guido Roland Hiertz, Aachen (DE); Leif Wilhelmsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 721 days.

(21) Appl. No.: 17/599,167

(22) PCT Filed: Apr. 2, 2019

(86) PCT No.: PCT/EP2019/058284
§ 371 (c)(1),
(2) Date: Sep. 28, 2021

(87) PCT Pub. No.: WO2020/200428
PCT Pub. Date: Oct. 8, 2020

(65) Prior Publication Data
US 2022/0191075 A1    Jun. 16, 2022

(51) Int. Cl.
*H04L 27/02* (2006.01)
*H04L 27/00* (2006.01)
(Continued)

(52) U.S. Cl.
CPC .......... *H04L 27/02* (2013.01); *H04L 27/0008* (2013.01); *H04L 27/2607* (2013.01); *H04W 52/0229* (2013.01)

(58) Field of Classification Search
CPC . H04L 27/02; H04L 27/0008; H04L 27/2607; H04L 25/03866; H04W 52/0229
(Continued)

(56) References Cited

U.S. PATENT DOCUMENTS 5,465,269 A * 11/1995 Schaffner ............ H04J 13/0048
370/335
6,075,812 A *  6/2000 Cafarella ............... H04B 1/711
375/E1.032
(Continued)

FOREIGN PATENT DOCUMENTS

EP        1519499 B1 * 12/2006     ........... H04B 10/505

OTHER PUBLICATIONS

Steve Shellhammer et al.; Proposed Draft WUR PHY Specification; IEEE 802.18-18/0152r5x; Jan. 2018, consisting of 15-pages.
(Continued)

*Primary Examiner* — Emmanuel Bayard
(74) *Attorney, Agent, or Firm* — Weisberg I.P. Law. P.A.

(57) ABSTRACT

Transmitting a first data stream to a first station and simultaneously transmitting a second data stream to a second station. A method includes modulating a first signal by the first data stream to form a second signal, modulating the second signal by the second data stream to form a third signal, and transmitting the third signal by conversion to a transmission frequency to form a radio frequency signal, amplifying the radio frequency signal and providing the amplified radio frequency signal to an antenna. The modulation of the first signal is performed by scrambling of the first signal and the modulation of the second signal is performed by binary amplitude shift keying of the second signal, or the modulation of the first signal is performed by binary amplitude shift keying of the first signal and the modulation of the second signal is performed by scrambling of the second signal.

26 Claims, 14 Drawing Sheets

(51) Int. Cl.
*H04L 27/26* (2006.01)
*H04W 52/02* (2009.01)

(58) Field of Classification Search
USPC .......................... 375/141–142, 219, 295–297
See application file for complete search history.

(56) References Cited

U.S. PATENT DOCUMENTS

| | | | | |
|---|---|---|---|---|
| 2003/0081655 A1* | 5/2003 | Nakamura | ............ | H04B 1/7103 |
| | | | | 375/E1.024 |
| 2003/0198478 A1* | 10/2003 | Vrazel | ................. | H04B 10/675 |
| | | | | 398/183 |
| 2005/0069330 A1* | 3/2005 | Kao | ..................... | H04B 10/541 |
| | | | | 398/188 |
| 2010/0226497 A1* | 9/2010 | Michaels | ................ | H04L 9/001 |
| | | | | 380/28 |
| 2010/0315282 A1* | 12/2010 | Stayton | .................. | H04L 27/02 |
| | | | | 342/40 |
| 2010/0316090 A1* | 12/2010 | Chester | ............... | H04J 13/0018 |
| | | | | 375/147 |
| 2011/0019719 A1* | 1/2011 | Michaels | ............ | H04J 13/0018 |
| | | | | 375/142 |
| 2018/0152333 A1 | 5/2018 | Shellhammer et al. | | |

OTHER PUBLICATIONS

Steve Shellhammer et al.; WUR Power Spectral Density; IEEE 802.11-18/0824r1; May 2018, consisting of 16-pages.
Steve Shellhammer et al.; Spec Text on MC-OOK Symbol Randomization, IEEE 802.11-18/1567r2, Sep. 2018, consisting of 9-pages.
International Search Report and Written Opinion dated Dec. 3, 2019 for International Application No. PCT/EP2019/058284 filed Apr. 2, 2019, consisting of 10-pages.
Miguel Lopez et al.; Spectral line suppression for MC-OOK; IEEE-SA Mentor, vol. 802.11ba, No. 1, Jul. 9, 2018, consisting of 14-pages.

* cited by examiner

AVOIDING SPECTRAL LINES FOR WAKE UP PACKET OOK SIGNAL

CROSS-REFERENCE TO RELATED APPLICATIONS

This application is a Submission Under 35 U.S.C. § 371 for U.S. National Stage Patent Application of International Application Number: PCT/EP2019/058284, filed Apr. 2, 2019 entitled "AVOIDING SPECTRAL LINES FOR WAKE UP PACKET OOK SIGNAL," the entirety of which is incorporated herein by reference.

TECHNICAL FIELD

The present disclosure generally relates to an approach for transmitting a multiplexed signal from multiple data streams modulated with multiple modulations, respectively. The present disclosure also relates to receiving at least one of the multiplexed signals. In particular, the disclosure relates to using one of the data streams as a source of entropy for symbol scrambling.

BACKGROUND

Wake-up receivers (WUR), sometimes also referred to as wake-up radios, provide a means to significantly reduce the power consumption in receivers used in wireless communication. The idea with a WUR is that it can be based on a very relaxed architecture, as it only needs to be able to detect the presence of a wake-up signal, but will not be used for any data reception.

A commonly used modulation for a wake-up packet (WUP) used for the wake-up radios, i.e., the signal sent to the WUR, is on-off keying (OOK). OOK is a binary modulation, where a logical one is represented with sending a signal (ON) whereas a logical zero is represented by not sending a signal (OFF). In IEEE 802.11 draft specification with title "Proposed Draft WUR PHY Specification" dated 2018 Jan. 17, the WUP is called WUR PPDU.

In IEEE 802.11 task group (TG) named IEEE 802.11ba, the PHY and MAC layer is standardized for a Wake-Up Radio to be used as a companion radio to the IEEE 802.11 primary communications radio (PCR) with the mere purpose to significantly reduce the power consumption. FIG. 1 schematically illustrates a PCR and WUR setup. The WUR and IEEE 802.11 radio may share the same antenna. When the WUR is turned on and waiting for a wake up message in a WUP, the IEEE 802.11 radio chipset can be switched off to preserve energy. Once the wake up message is received by the WUR, it wakes up the IEEE 802.11 radio chipset which then can start Wi-Fi communication with an access point (AP).

In the IEEE 802.11 draft specification with title "Proposed Draft WUR PHY Specification" it is proposed to apply Manchester coding to the information bits of the WUP. That is, a logical "0" is encoded as "10" and a logical "1" as "01". Therefore, every data symbol comprises an "ON" part (where there is energy) and an "OFF" part, where there is no energy. In addition, it is proposed to generate the WUP by means of an inverse fast Fourier transform (IFFT), as this block is already available in Wi-Fi transmitters supporting e.g. 802.11a/g/n/ac. FIG. 10 schematically illustrates this approach for generating the desired signal. Specifically, the approach discussed for generating the OOK is to use the 13 sub-carriers in the centre, and then populating these with some signal to represent ON and to not transmit anything at all to represent OFF. This approach differs slightly from traditional OOK in that multiple carriers are used to generate the ON part. Therefore, the OOK scheme being standardized in 802.11ba is referred to as multicarrier OOK (MC-OOK). The IFFT may have 64 points and may operate at a sampling rate of 20 MHz, and just as for ordinary orthogonal frequency division multiplexing (OFDM) a cyclic prefix (CP) is added after the IFFT operation in order to have the OFDM symbol duration as being used in IEEE 802.11a/g/n/ac.

An important feature of MC-OOK is that the same OFDM symbol is used to generate MC-OOK. In other words, the same frequency domain symbols are used to populate the non-zero subcarriers in order to generate the "ON" part of every Manchester coded data symbol. Using the same OFDM symbol to generate the "ON" part of every Manchester coded data symbol has the advantage that the ON waveform can be optimized to satisfy some criterion, such as to have low peak to average power ratio, or to yield good performance in a particular propagation environment. On the other hand it has the disadvantage that the WUP exhibits strong correlations in time, resulting in spectral lines, which are spikes in the Power Spectral Density (PSD), as illustrated as an example PSD in FIG. 10. Spectral lines are undesirable because in some regulatory domains there are limits in the power that can be transmitted in any given narrow band. For example, in the USA, the Federal Communications Commission requires that digitally modulated signals in the 2.4 MHz band transmit a power less than 8 dBm in any 3 kHz band. Hence, the presence of spectral lines may limit the maximum TX power for the WUP to a value that is less than what would be allowed if spectral lines were not present. For this reason, some form of symbol scrambling is desired to be added to the ON waveform. This scrambling should be designed such that the spectral lines are suppressed, and the properties on the ON signal are preserved. Examples of properties of the ON waveform are low peak to average power ratio, or good performance in some propagation environment. Proposals for scrambling of the On waveform include phase randomization, as demonstrated in contribution IEEE 802.11-18/0824r1 by Shellhammer et al with title "WUR Power Spectral Density" and dated 2018 May 9, and cyclic shift randomization as demonstrated in contribution IEEE 802.11-18/1179r1 by Lopez et al with title "Spectral line suppression for MC-OOK" and dated 2018 Jul. 9.

FIG. 2 schematically illustrates an MC-OOK transmitter implementing symbol scrambling by means of both phase randomization and cyclic shift randomization as has been proposed in IEEE 802.11ba Task Group. Using this methodology, a bit stream, labeled b3 in FIG. 2, is used to decide whether to impart a phase shift of 180 degrees to the ON waveform. This can be implemented by mapping the bit value of b3 to +1 or −1 via a binary phase shift keying, BPSK, mapper 200 to generate a BPSK symbol and then multiplying the ON waveform by this value by a multiplier 202. In addition, three bit streams, labeled b0, b1, b2 in FIG. 2 are used to generate an integer n between 0 and 7. This integer n is used to choose one among eight predefined cyclic shifts, which is then applied to the ON waveform by a cyclic shifter 204. The purpose of a Linear Feedback Shift Register (LFSR) 206 as depicted in FIG. 2 is to generate pseudo-random bits. The LFSR is easy to implement and gives good results in practice. However, other methods could have been employed to generate the pseudo-random bits, for example table lookup, a different linear feedback register, or a different pseudo-random number generator.

More generally, the MC-OOK ON waveform generation may be performed as illustrated in FIG. 3, where it is emphasized that a source of entropy is needed in order to produce random bits b0, . . . , b3. The rest of the setup illustrated in FIG. 3 is recognized from FIG. 2.

The above information disclosed in this Background section is only for enhancement of understanding of the background of the disclosure and therefore it may contain information that does not form the prior art that is already known to a person of ordinary skill in the art.

SUMMARY

The disclosure aims at an approach for transmitting a multiplexed signal from multiple data streams modulated with multiple modulations, respectively, and is based on the inventors' realization that a signal with enough entropy for the scrambling can be obtained from one of the multiple data streams to be transmitted. This provides for the desired power spectral density. This also provides for piggy-backed signal transmission to improve spectral efficiency.

According to a first aspect, there is provided a method of transmitting a first data stream to a first station and simultaneously transmitting a second data stream to a second station. The method comprises modulating a first signal by the first data stream to form a second signal, modulating the second signal by the second data stream to form a third signal, and transmitting the third signal by conversion to a transmission frequency to form a radio frequency signal, amplifying the radio frequency signal and providing the amplified radio frequency signal to an antenna. Either the modulation of the first signal is performed by scrambling of the first signal and the modulation of the second signal is performed by binary amplitude shift keying of the second signal, or the modulation of the first signal is performed by binary amplitude shift keying of the first signal and the modulation of the second signal is performed by scrambling of the second signal.

The binary amplitude shift keying may be on-off keying. The binary amplitude shift keying may include Manchester coding.

The first signal may be an orthogonal frequency division multiplex signal.

The scrambling may be performed by a cyclic shift and/or a phase shift.

The data stream being modulated by binary amplitude shift keying may represent a wake-up signal.

The data stream modulating the scrambling, at an instance where no data is available to be sent, may be padded with a randomized sequence.

The data stream modulating the scrambling, at an instance where binary amplitude shift keying provides a low amplitude state, may be padded with a randomized sequence.

According to a second aspect, there is provided a network node arranged to transmit a first data stream to a first station and simultaneously transmit a second data stream to a second station. The network node comprises a first modulator arranged to modulate a first signal by the first data stream to form a second signal, a second modulator arranged to modulate the second signal by the second data stream to form a third signal, and a transmitter arranged to transmit the third signal by conversion to a transmission frequency to form a radio frequency signal, amplifying the radio frequency signal and providing the amplified radio frequency signal to an antenna. Either the first modulator is a scrambling modulator arranged to modulate the first signal by scrambling of the first signal and the second modulator is a binary amplitude shift keying modulator arranged to modulate the second by binary amplitude shift keying of the second signal, or the first modulator is a binary amplitude shift keying modulator arranged to modulate the first signal by binary amplitude shift keying the first signal and the second modulator is a scrambling modulator arranged to modulate the second signal by scrambling the second signal.

The binary amplitude shift keying may be on-off keying. The binary amplitude shift keying may include Manchester coding.

The network node may comprise a waveform generator arranged to generate the first signal by inverse fast Fourier transform, wherein the first signal is an orthogonal frequency division multiplex signal.

The scrambling may include a cyclic shift and/or a phase shift.

The data stream being modulated by binary amplitude shift keying may represent a wake-up signal.

The network node may comprise a sequence generator arranged to generate a randomized sequence, wherein the data stream modulating the scrambling, at an instance where no data is available to be sent, may be padded with the randomized sequence.

The network node may comprise a sequence generator arranged to generate a randomized sequence, wherein the data stream modulating the scrambling, at an instance where binary amplitude shift keying provides a low amplitude state, may be padded with a randomized sequence.

According to a third aspect, there is provided a method of receiving a dual modulated signal, which signal is modulated to carry a first data stream and a second data stream. The first data stream is modulated by scrambling and the second data stream is modulated with binary amplitude shift keying. The method is arranged to extract at least the first data stream. The method comprises estimating a shift applied to the signal for each high-amplitude part of the signal, and determining the first data stream from the estimated shift.

The estimated shift may comprise phase shift and/or cyclic shift.

The binary amplitude shift keying may be on-off keying. The binary amplitude shift keying may include Manchester coding. The determination of the first data stream from the estimated shift may be based on a position of the high-amplitude part in a Manchester pair.

According to a fourth aspect, there is provided a receiver of a dual modulated signal, which signal is modulated to carry a first data stream and a second data stream. The first data stream is modulated by scrambling and the second data stream is modulated with binary amplitude shift keying. The receiver is arranged to extract at least the first data stream. The receiver comprises a receiver circuitry for receiving the signal from a receiver antenna, a shift estimator arranged to estimate a shift applied to the signal for each high-amplitude part of the signal, and a data extractor arranged to determine the first data stream from the estimated shift.

The estimated shift may comprise phase shift and/or cyclic shift.

The binary amplitude shift keying may be on-off keying. The binary amplitude shift keying may include Manchester coding. The determination of the first data stream from the estimated shift may be based on a position of the high-amplitude part in a Manchester pair.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 1:
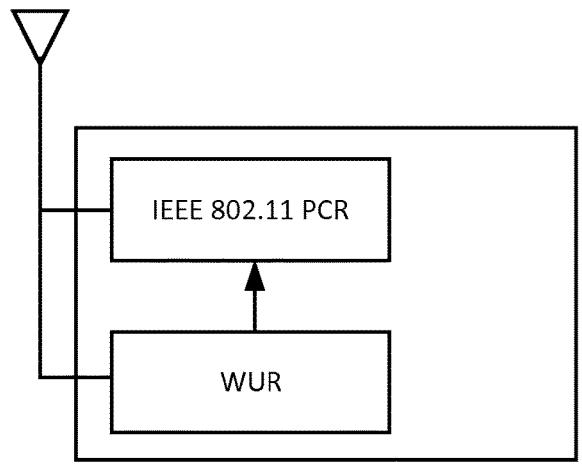
FIG. 1 schematically illustrates station with a PCR and WUR setup.

A well-known approach for generating pseudorandom sequences are the above-mentioned linear feedback shift register using a proper polynomial. Considering the desire for an efficient and low-resource consuming solution for producing the two or more sequences, where the two or more sequences have limited correlation, e.g. not to risk introducing new undesired spurs in a signal when shaping the signal. However, in this disclosure it is suggested an approach for generating the two or more sequences from a data stream where it is assumed that the data inherently has enough entropy for producing sequences with low mutual correlation. The additional generated sequences will not have the same characteristics as when generated by pseudo random sequence generators but will have low enough correlation for the purposes of the signal shaping approaches of this disclosure and will also have sufficient performance for other applications where multiple sequences with low correlation are desired.

The herein disclosed approach that a signal with enough entropy for the scrambling can be obtained from one of a plurality of data streams to be transmitted. This provides for the desired power spectral density. This also provides for piggy-backed signal transmission to improve spectral efficiency.

To achieve spectrum efficiency in a wireless system, high spatial reuse is required, i.e., that the same frequency can be reused by cells that are operating within range of one another, is achieved. In IEEE 802.11, the channel access is based on carrier sense multiple access with collision avoidance (CSMA/CA), where a device listens on the channel and only transmits if the channel is sensed to be idle. A non-trivial task is to find out when a channel should be declared to be idle and when it should be declared to be busy. If one selects a high threshold for when the channel can be declared to be idle, there is an increased risk that one initiates a transmission that will result in detrimental interference. This is commonly referred to as the hidden node problem. On the other hand, if one selects the threshold too low, one will often declare the channel to be busy although it would have been possible to transmit without causing any problems. This is commonly referred to as the exposed node problem. The trade-off in the choice of threshold has thus traditionally been hidden nodes or exposed nodes. Part of this problem can be referred to that it is not possible to determine from which cell a transmission belong since hidden node often is a problem for transmission coming from the same cell, whereas exposed nodes is a problem for transmissions coming from another cell. With the introduction of IEEE 802.11ax, so called color bits are transmitted as a means to identify a cell. In this way one can select a different threshold for carrier sense depending on whether the transmission is determined to come from the same cell or from another cell. The use of color bits is seen as a good approach to obtain high spectrum efficiency.

Figure 4:
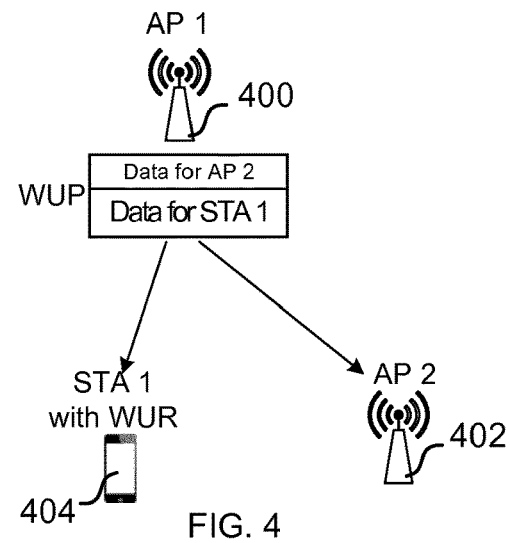
FIG. 4 schematically illustrates an AP capable of transmitting a WUP for a station with WUR and data for another station or AP piggy-backed on the WUP.

Since the data rates for the WUP are low, typically 62.5 kbps or 250 kbps, the airtime occupancy of WUPs can be non-negligible. Moreover, WURs are expected to often operate in the crowded 2.4 GHz band. The reason is that WURs have relatively poor sensitivity, which can be partially compensated by the more favourable propagation in 2.4 GHz, compared to other unlicensed bands at 5 GHz or above. Hence, it would be desirable for the transmitting AP 400 to be able to piggy-back information in the WUP, without increasing the duration of the WUP. Said piggy-backed information could be intended for APs and STAs 402 generally different from the WUR 404 targeted by the AP 400, as illustrated in FIG. 4.

This would increase spectrum efficiency and facilitate coordination among APs and STAs, both within a basic service set, BSS, and also with overlapping BSSs.

Figure 9:
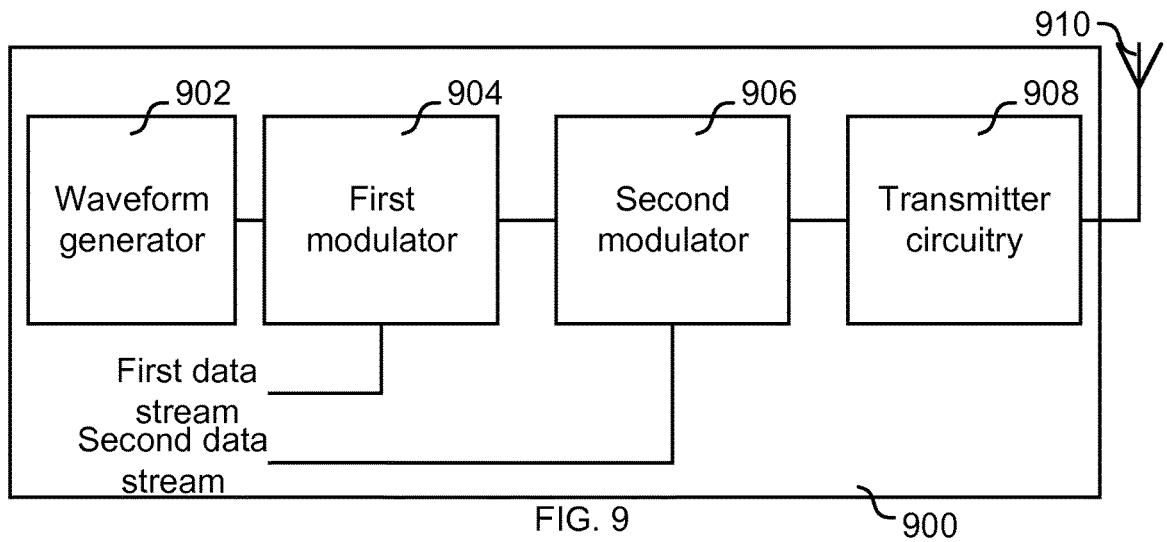
FIG. 9 is a block diagram schematically illustrating a transmitter according to an embodiment.
Figure 10:
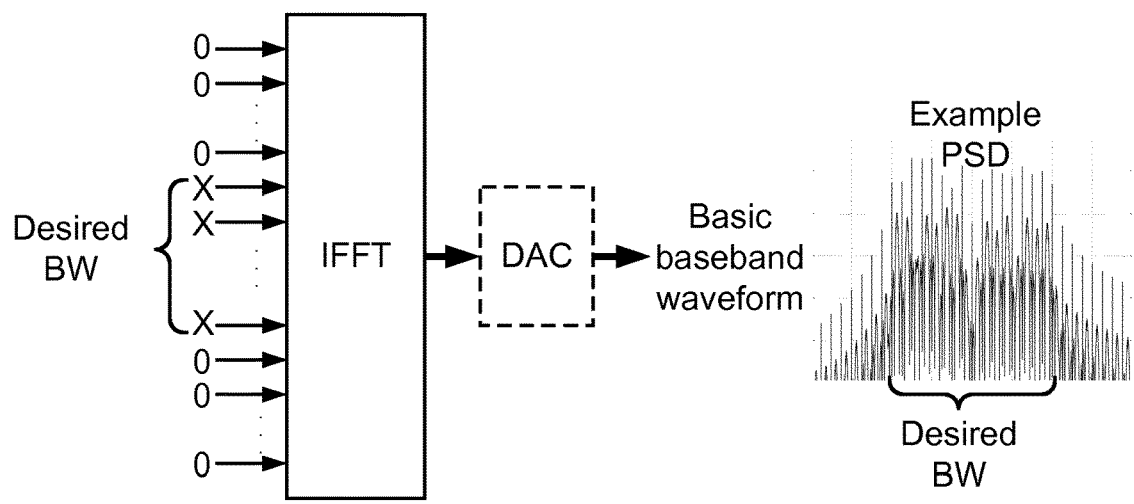
FIG. 10 schematically illustrates a structure for generating a basic baseband waveform using IFFT.

FIG. 9 is a block diagram schematically illustrating a transmitter 900 according to an embodiment. A waveform generator 902, e.g. as demonstrated with reference to FIG. 10, provides an OFDM signal to a first modulator 904 where the OFDM signal is modulated by a first data stream. The output of the first modulator 904 is provided to a second modulator 906 where modulation is performed with a second data stream. The second modulator 906 provides its output to transmitter circuitry 908 where the signal is arranged for wireless transmission via an antenna arrangement 910.

One way to piggy-back information on the WUP is to modulate the phase and/or amplitude of the subcarriers comprised in the non-null OFDM symbols of a WUP. From the point of view of the receiving AP or STA, the WUP would look like an OFDM packet where some of the OFDM symbols have been nulled. However, this is not possible if MC-OOK is used to generate the WUP, since the same OFDM symbol is used to generate the "ON" part of every Manchester coded information symbol. This precludes the transmission of information by modulation of the active subcarriers since they have predefined values. Instead, this disclosure provides for the improved spectral efficiency by enabling the piggy-backed data to also provide the entropy desired for providing the desired power spectral density.

Thus, a technique that allows an AP transmitting a WUP with suitable power spectral density characteristics is provided which also provides the ability to piggy-back some information on the WUP in order to communicate with other APs or STAs. What is achieved is to transmit a first data stream to a first station and simultaneously transmitting a second data stream to a second station. This is achieved by modulating a first signal by the first data stream to form a second signal, modulating the second signal by the second data stream to form a third signal, and transmitting the third signal by conversion to a transmission frequency to form a radio frequency signal, amplifying the radio frequency signal and providing the amplified radio frequency signal to an antenna. The transmitted signal can thus comprise the WUP, which is enabled to be decoded by a receiver at a station having WUR features as for example illustrated in FIG. 1. The transmitted signal also comprises the other data stream, although being amplitude modulated by the WUR signal, which other data stream can be decoded by another station, i.e. station or access point, to for example convey low-rate signaling data. The performance loss due to the amplitude modulation is readily handled by transmitting padding bits during the duration of an "OFF" part, or by adequate channel coding and selection of reasonable modulation and coding scheme. Either the modulation of the first signal is performed by scrambling of the first signal and the modulation of the second signal is performed by binary amplitude shift keying of the second signal, or the modulation of the first signal is performed by binary amplitude shift keying of the first signal and the modulation of the second signal is performed by scrambling of the second signal. The alternatives are for example demonstrated with reference to FIGS. 6 and 7, or FIGS. 11 and 12.

Figure 5:
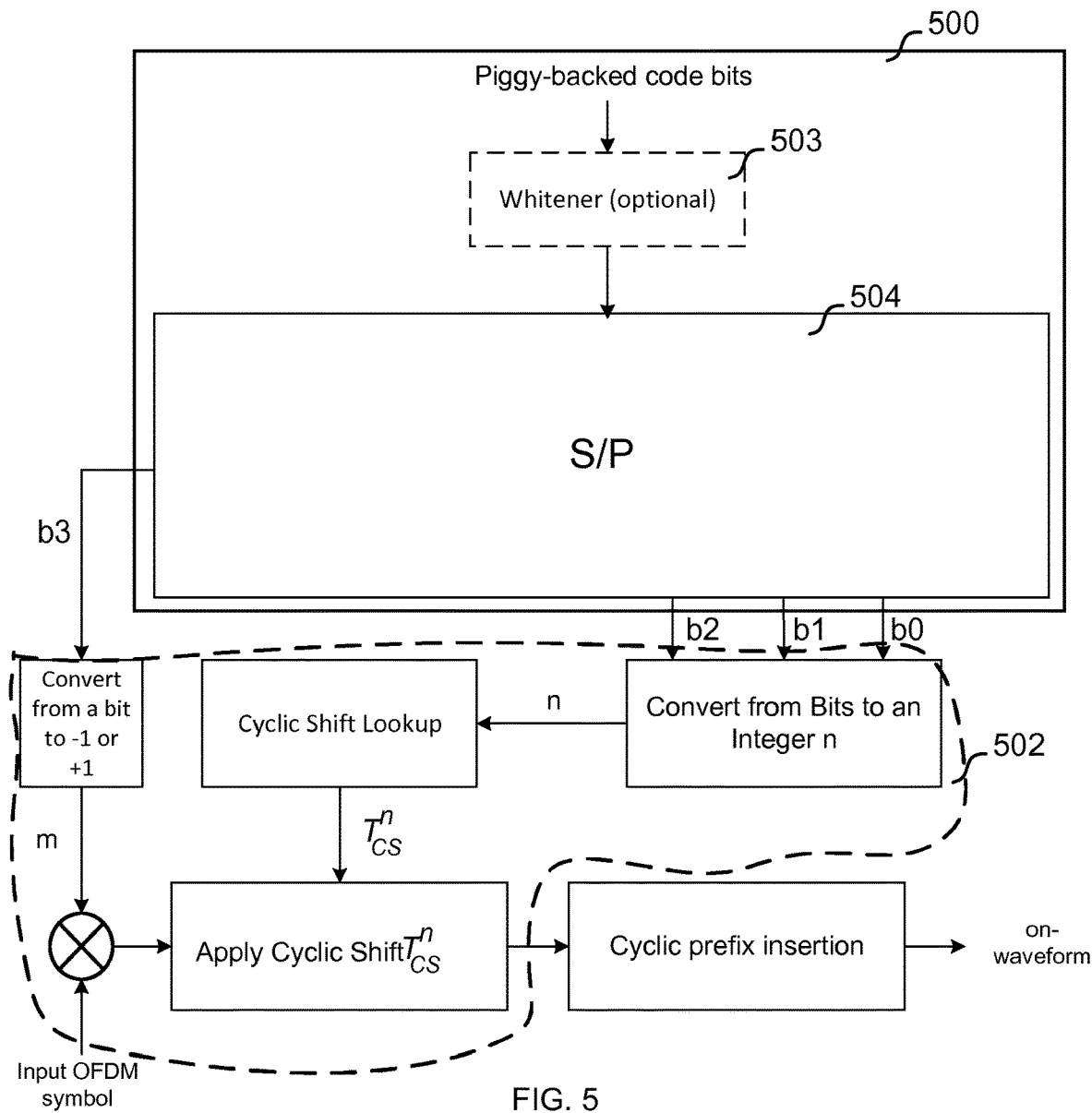
FIG. 5 schematically illustrates an entropy source based on one of the data streams for generating input to a symbol scrambler.

FIG. 5 schematically illustrates an entropy source 500 based on one of the data streams, i.e. the piggy-backed code bits, for generating input to a symbol scrambler 502. The data stream is optionally whitened, e.g. by a filter 503, for further enhancing its properties for being an entropy source and is provided to a serial-to-parallel converter 504, assuming that the data stream bits are provided serially. The bits arranged in parallel are now picked to form the entropy that is used by for example a similar symbol scrambler as used in the examples given in FIGS. 2 and 3. Consider an OFDM symbol input to the scrambler, the power spectral density of the output waveform will have reduced spikes when looking at its spectral powers than the input OFDM symbol. The OFDM symbol is for example provided as schematically illustrated in FIG. 10, where predefined values, corresponding to a desired waveform for e.g. Manchester coded OOK, are provided to taps of an inverse fast Fourier transformer, IFFT, and possibly the output of the IFFT is converted to analog domain if baseband processing is to be performed by analog circuitry.

The scrambled OFDM signal will thus have a more desirable power spectrum density and will also hold the information provided by the provided bit stream. A receiver will be able to decode the piggy-backed bits after synchronisation, FFT and estimation of scrambling sequence. Here, the estimation of the scrambling sequence, i.e. the information based on the piggy-backed bits, is readily available since the input to the taps of the IFFT at the transmitter is known.

Figure 6:
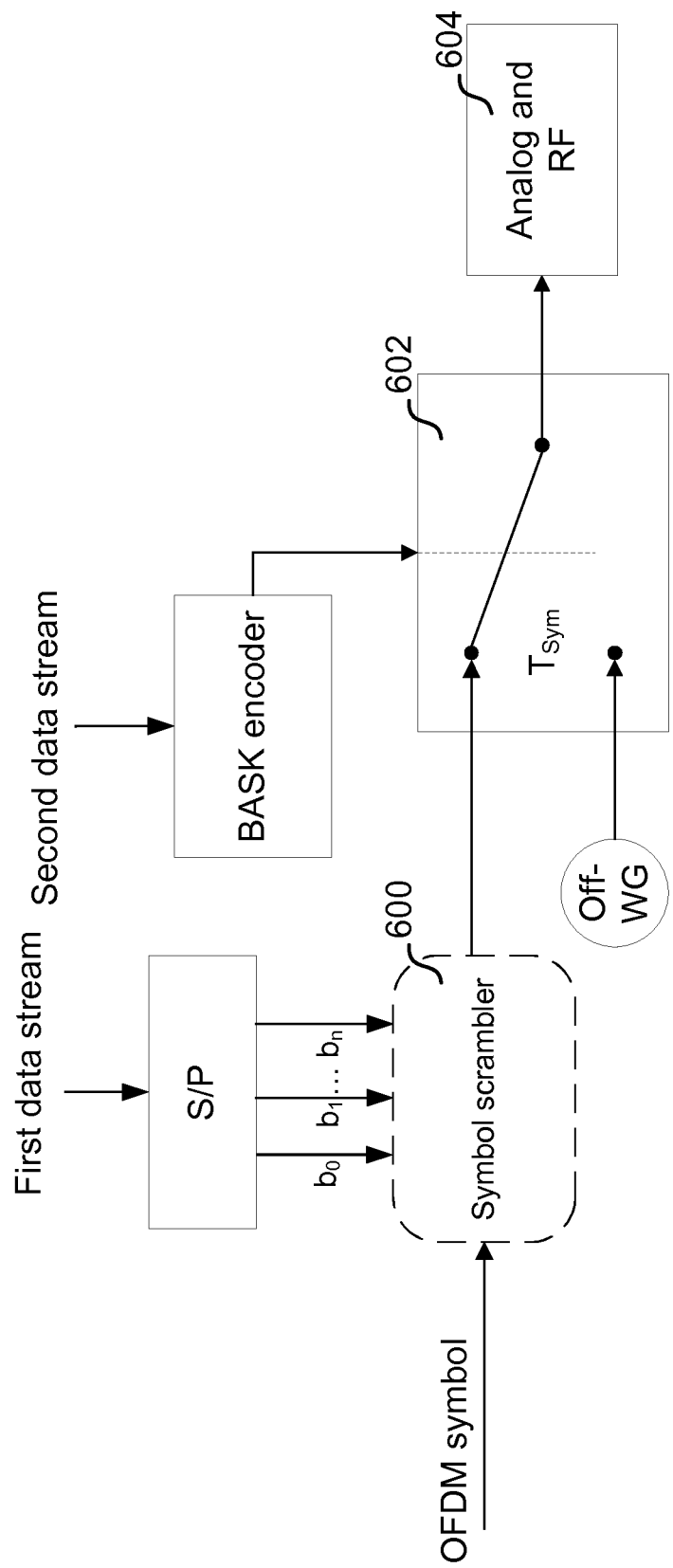
FIG. 6 schematically illustrates an embodiment where scrambling is performed prior to application of the OOK encoding.
Figure 19:
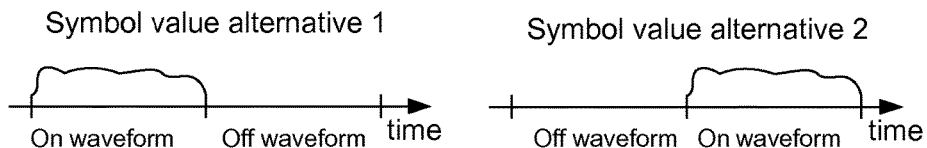
FIG. 19 schematically illustrates traditional Manchester coded OOK signal alternatives.

FIG. 6 schematically illustrates an embodiment where scrambling is performed prior to application of the OOK encoding. An OFDM signal from a waveform generator, e.g. as demonstrated with reference to FIG. 10, is provided to a symbol scrambler 600 where the OFDM signal is scrambled by the first data stream. This is performed to provide a suitable power spectral density. At the same time, the piggy backed bits are included in the signal. The output from the symbol scrambler 600 is provided to an OOK encoder 602 where one of two symbol alternatives, e.g. as those illustrated in FIG. 19, is chosen based on the second data stream. The second data stream can for example represent a WUP. The output from the OOK encoder 602 is provided to radio circuitry 604 for transmission.

Figure 7:
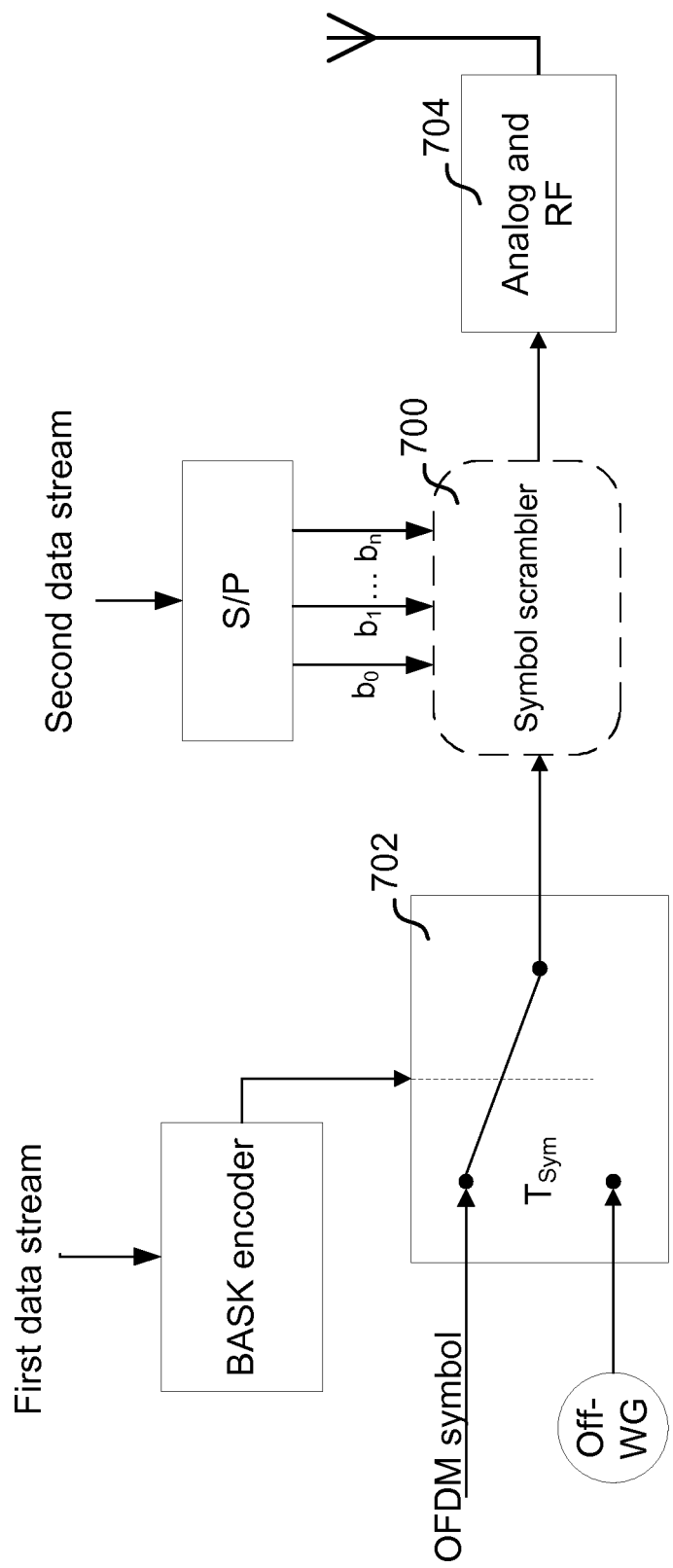
FIG. 7 schematically illustrates an embodiment where scrambling is performed after application of the OOK encoding.

FIG. 7 schematically illustrates an embodiment where application of the OOK encoding is performed prior to scrambling. An OFDM signal from a waveform generator, e.g. as demonstrated with reference to FIG. 10, is provided to an OOK encoder 702 where one of two symbol alternatives, e.g. as those illustrated in FIG. 19, is chosen based on the first data stream. Here, the first data stream can for example represent a WUP. The output from the OOK encoder 602 is provided to a symbol scrambler 700 where the OFDM signal is scrambled by the second data stream. The second data stream can here comprise the piggy backed bits. The output from the symbol scrambler 700 is provided to radio circuitry 704 for transmission.

Figure 8:
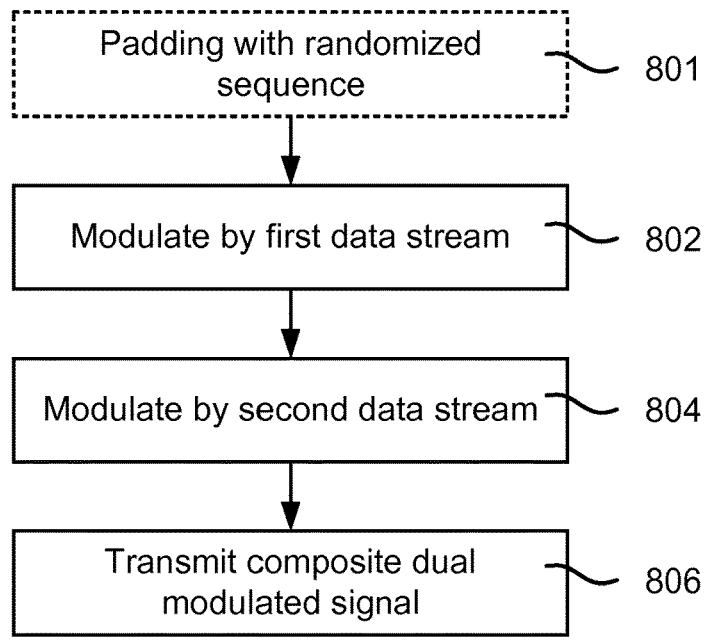
FIG. 8 is a flow chart illustrating a method for a transmitter according to an embodiment.

FIG. 8 is a flow chart illustrating a method for a transmitter according to an embodiment. The method aims at transmitting a first data stream to a first station and simultaneously transmitting a second data stream to a second station. The method comprises modulating 802 a first signal by the first data stream to form a second signal and modulating 804 the second signal by the second data stream to form a third signal. The third signal is transmitted 806 by conversion to a transmission frequency to form a radio frequency signal, amplifying the radio frequency signal and providing the amplified radio frequency signal to an antenna. Here, either the modulation of the first signal is performed by scrambling of the first signal and the modulation of the second signal is performed by binary amplitude shift keying of the second signal, or the modulation of the first signal is performed by binary amplitude shift keying of the first signal and the modulation of the second signal is performed by scrambling of the second signal. Cf. alternatives of FIGS. 6 and 7. In some cases, there is not enough signal streams to match such that the scrambling can be done by the data stream modulating the scrambling. In such cases the data stream being modulating the scrambling, at an instance where either no data is available to be sent or it is not desired to send data, is padded 801 with a randomized sequence, which may be provided as demonstrated above e.g. with reference to FIG. 2.

Figure 11:
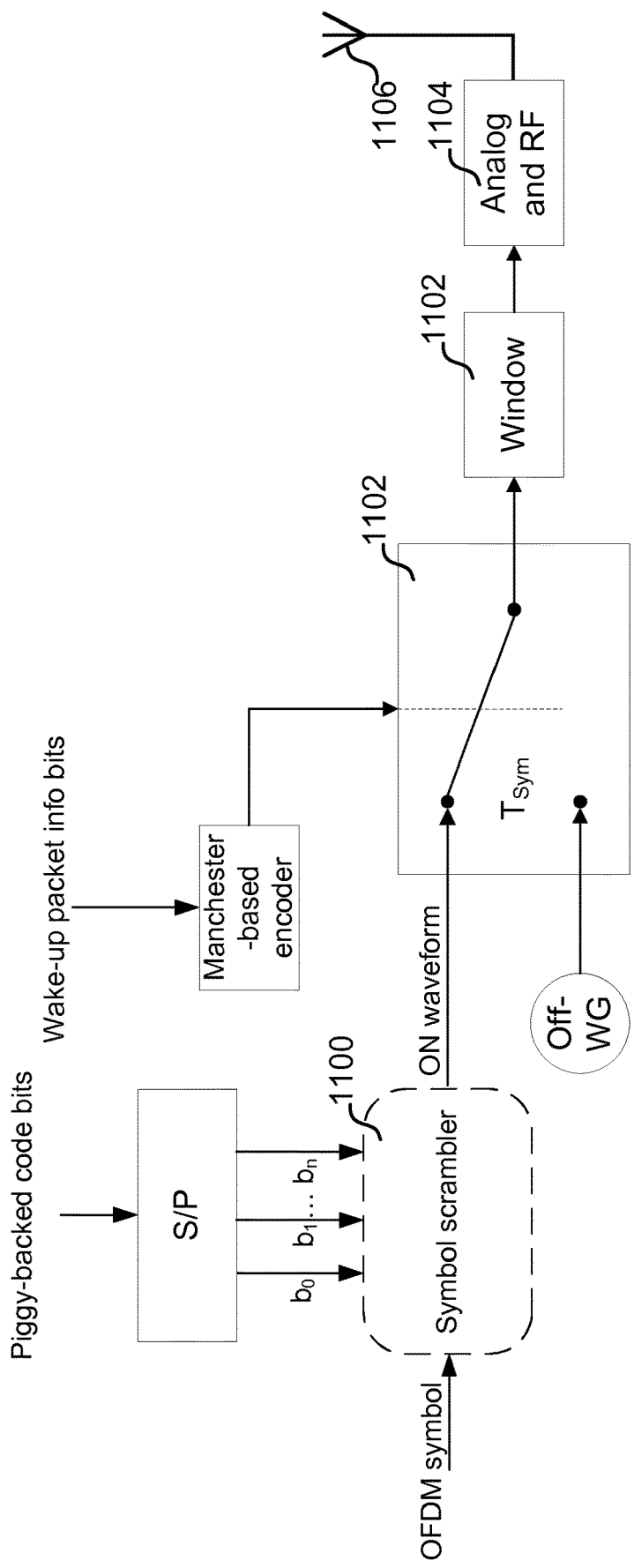
FIG. 11 schematically illustrates a transmitter where scrambling is performed prior to application of the OOK encoding.

FIG. 11 schematically illustrates a transmitter where scrambling is performed prior to application of the OOK encoding. An OFDM signal is provided to a symbol scrambler 1100 where the OFDM signal is scrambled by cyclic shift and phase shift, as demonstrated above, based on inherent entropy of piggy-backed code bits. Thus, signal shaping of the OFDM signal to get better power spectral density characteristics is provided. At the same time, the improved signal now also contains the information provided by the piggy-backed information such that some station can interpret that information. The shaped signal is provided to an OOK encoder 1102 where it is encoded by a wake-up packet. The signal now both contains the piggy-backed information and the wake-up packet. Thus, a WUR can decode the WUP and will not be negatively affected by the other information, which instead has been used for improving the basic signal provided from the waveform generator. A station receiving the piggy-backed information will experience an amplitude modulated version, compared with no involvement of the OOK encoding, but this is readily handled and may be quite similar to other disturbances on the channel between the transmitter and the station.

The aggregate signal is then provided for transmission, which may include some filtering in a windowing filter 1104 from which it is provided to analog and radio frequency (RF) conversion in analog and RF circuitry 1106 to then be transmitted through an antenna arrangement 1108.

Figure 15:
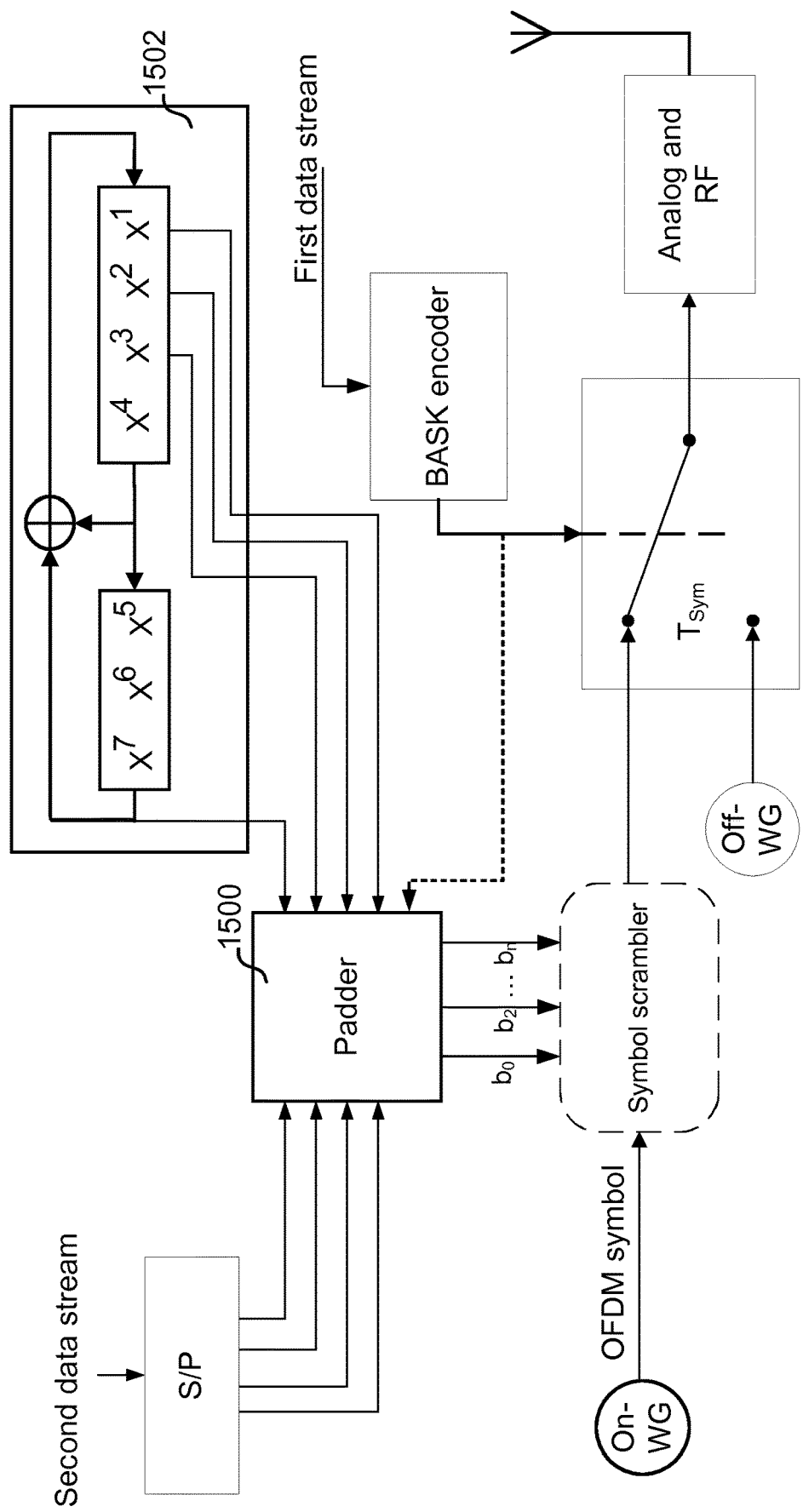
FIG. 15 schematically illustrates a transmitter according to an embodiment where scrambling is performed prior to application of the OOK encoding.

FIG. 15 schematically illustrates a transmitter according to an embodiment where scrambling is performed prior to application of the OOK encoding. The setup very much resembles the one demonstrated above with reference to FIG. 11, but here it is taken into account that the amount of information to be piggy-backed may not match the amount of information to be sent as e.g. wake-up signals. This is a problem since the piggy-backed information is used as entropy source and is needed to shape the signals in sense of power spectral density for the wake-up signals. Thus, the embodiment illustrated in FIG. 15 comprises a padder 1500 which pads the piggy-backed signal with artificially generated entropy signal, e.g. provided by a linear shift register arrangement 1502, to fill-up the data stream such that scrambling can be properly made. Furthermore, as will be discussed below, the insertion of piggy backed bits may be aligned with the OOK signal.

Figure 16:
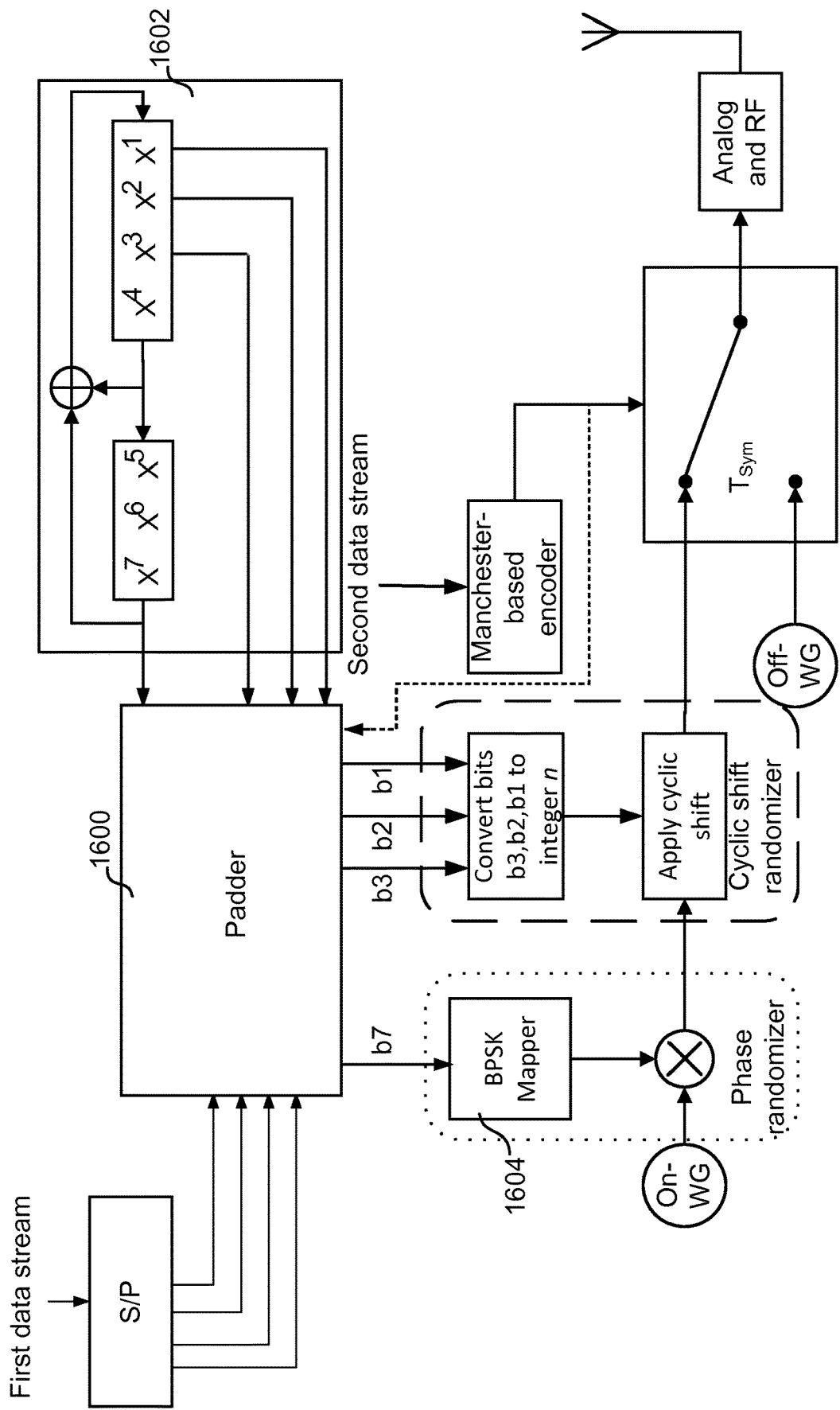
FIG. 16 schematically illustrates a transmitter according to an embodiment where scrambling is performed prior to application of the OOK encoding.

FIG. 16 schematically illustrates a transmitter according to an embodiment where scrambling is performed prior to application of the OOK encoding. As the set-ups discussed above, e.g. with reference to FIG. 15, but here with some tangible details on how the scrambling can be implemented. A padder 1600 receives the parallel bits from the second data stream, e.g. taken in chunks of four bits, and also receives the state values of the linear feedback register 1602, e.g. states from stages one, two, three, and seven to match where no bits from the second data stream is available. For the phase shifting, e.g. by a binary phase shift keying (BPSK) mapper 1604, the most significant bit (MSB) of respective four-bit chunk may be used, and when no such bit chunk is available, the value from state seven may be used for the phase shifting. Similarly, the three other bits of the four-bit chunk gives the integer cyclic shift, but where the bit chunk is not present, the bits of the stages one, two, and three from the shift register are used. In short, the padder 1600 tops up the second data stream with artificially generated entropy when the second data stream is not enough to provide entropy for the transmission of the first data stream. When the second data stream is to be sent but there is no or not enough data from the first data stream, that can be arranged by providing a default sequence in place of the first data stream, e.g. only ones or only zeroes (for the case of Manchester encoding), or any other sequence which does not affect functions, i.e. WUPs, of the first data stream. Furthermore, as will be discussed below, the insertion of piggy backed bits may be aligned with the OOK signal.

In a first alternative, the scrambling by the piggy backed bits is made continuously, i.e. some information may be lost during the OFF parts of the OOK signal. In practice, the information represented by the piggy backed bits may still be conveyed, e.g. due to proper channel coding of the information. That is, even if some bits are lost, the information can still be reconstructed at a receiver, although with an experienced slightly worse channel for the piggy backed information.

In a second alternative, the scrambling by the piggy backed bits can be aligned with the OOK signal. Here, padding can replace the piggy backed bits during the OOK signal being OFF. This results in reduced loss for the piggy backed information, which then is appended only during the OOK signal being ON. The dashed arrow between the output of the OOK encoder and the padder schematically illustrates this aligning.

Figure 12:
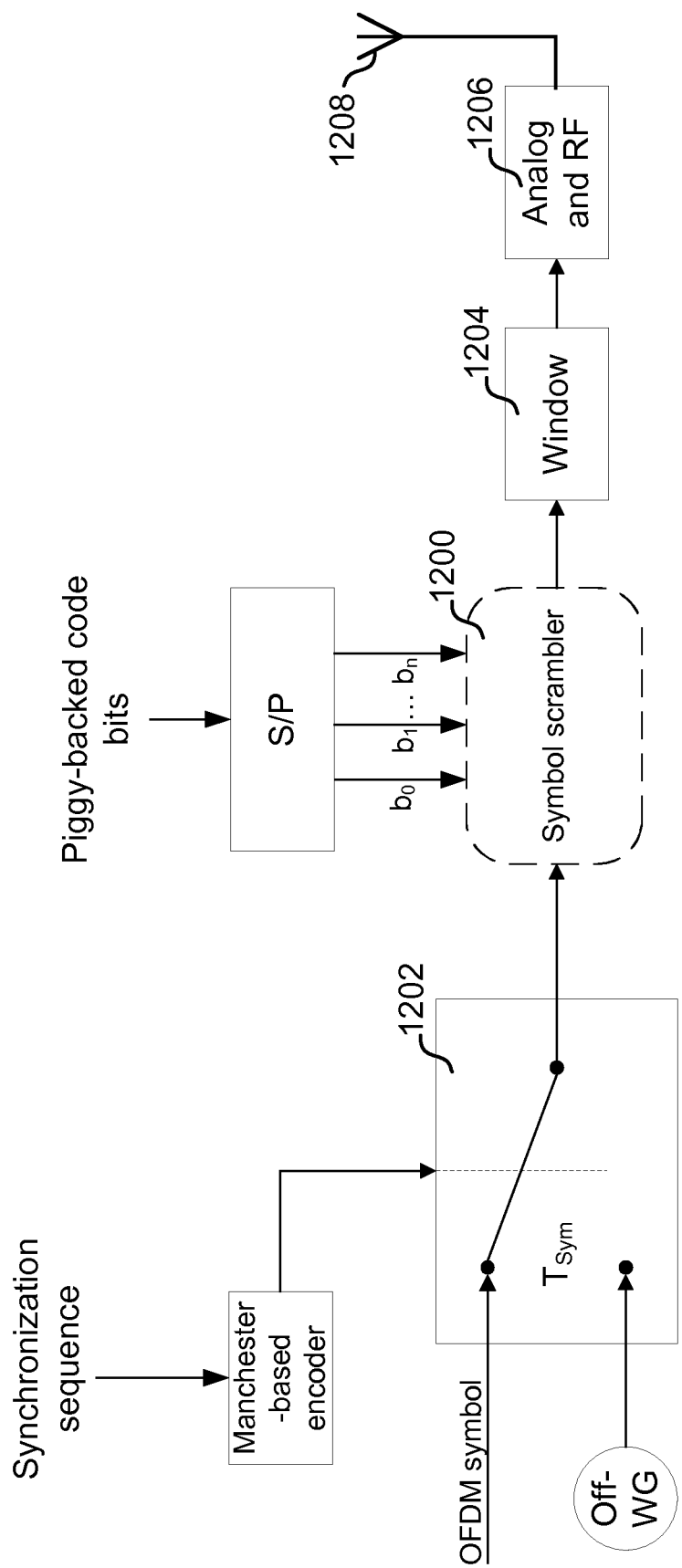
FIG. 12 schematically illustrates a transmitter where scrambling is performed after application of the OOK encoding.

FIG. 12 schematically illustrates a transmitter where scrambling is performed after application of the OOK encoding. An OFDM signal is provided to an OOK encoder 1202 where it is encoded by a wake-up packet. The OOK encoded signal is then provided to a symbol scrambler 1200 where the OOK encoded signal is scrambled by cyclic shift and phase shift, as demonstrated above, based on inherent entropy of piggy-backed code bits. Thus, signal shaping of the OOK encoded signal to get better power spectral density is provided. At the same time, the improved signal now also contains the information provided by the piggy-backed information such that some station can interpret that information. The signal now both contains the piggy-backed information and the wake-up packet. Thus, a WUR can decode the WUP and will not be negatively affected by the other information, which instead has been used for improving the basic signal provided from the waveform generator. A station receiving the piggy-backed information will experience an amplitude modulated version, compared with no involvement of the OOK encoding, but this is readily handled and may be quite similar to other disturbances on the channel between the transmitter and the station.

The aggregate signal is then provided for transmission, which may include some filtering in a windowing filter 1204 from which it is provided to analog and radio frequency (RF) conversion in analog and RF circuitry 1206 to then be transmitted through an antenna arrangement 1208.

Figure 13:
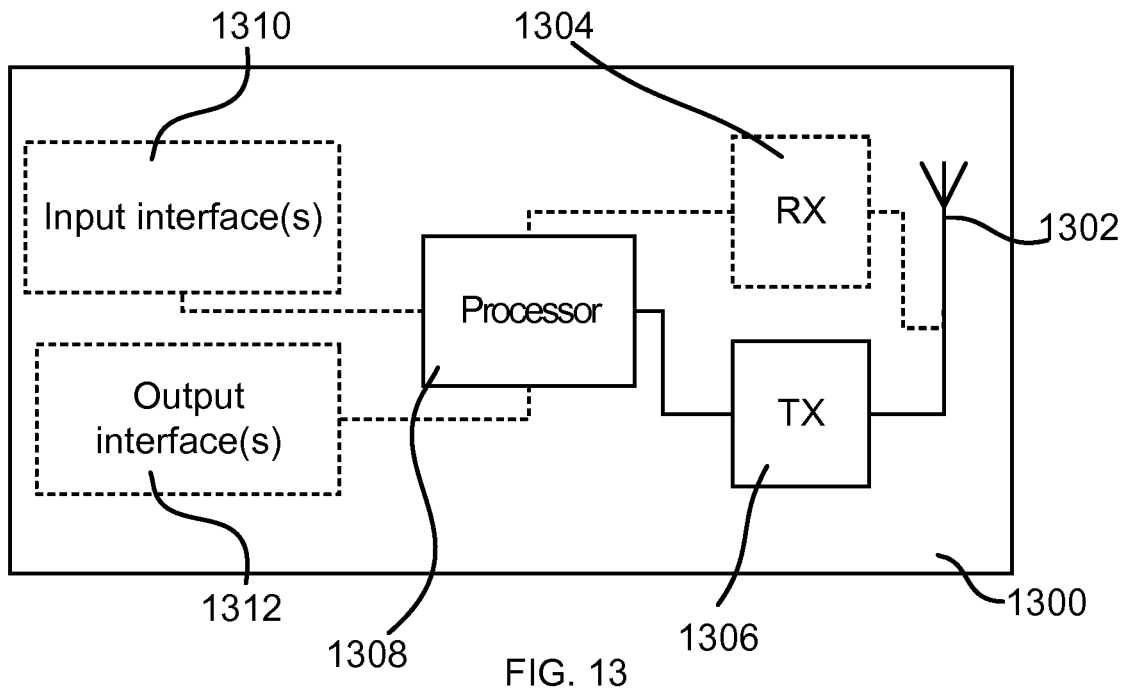
FIG. 13 is a block diagram schematically illustrating a network node according to an embodiment.

FIG. 13 is a block diagram schematically illustrating a network node 1300 according to an embodiment. The network node 1300, which for example may be an access point, comprises an antenna arrangement 1302, a receiver 1304 connected to the antenna arrangement 1302, a transmitter 1306 connected to the antenna arrangement 1302, a processing element 1308 which may comprise one or more circuits, one or more input interfaces 1310 and one or more output interfaces 1312. The interfaces 1310, 1312 can be operator interfaces and/or signal interfaces, e.g. electrical or optical. The network node 1300 is arranged to operate, in addition to traditional tasks for this kind of equipment, for providing an aggregate signal holding a WUP and also piggy-backed information as demonstrated above. In particular, by the processing element 1308 being arranged to perform the embodiments demonstrated above, the network node 1300 is capable of improving spectral efficiency when transmitting wake-up signals as demonstrated above. The processing element 1308 can also fulfill a multitude of tasks, ranging from signal processing to enable reception and transmission since it is connected to the receiver 1304 and transmitter 1306, executing applications, controlling the interfaces 1310, 1312, etc.

Figure 14:
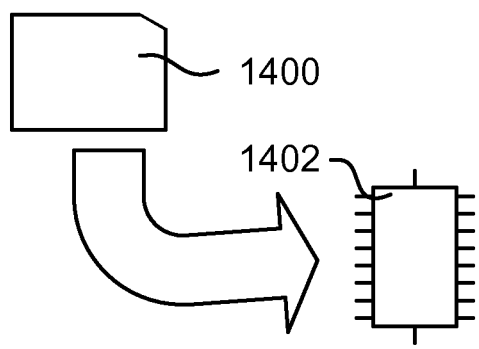
FIG. 14 schematically illustrates a computer-readable medium and a processing device.

The methods according to the present disclosure are suitable for implementation with aid of processing means, such as computers and/or processors, especially for the case where the processing element 1308 demonstrated above comprises a processor handling the aggregation of the first and second data streams into the same physical signal as demonstrated above. Therefore, there is provided computer programs, comprising instructions arranged to cause the processing means, processor, or computer to perform the steps of any of the methods according to any of the embodiments described with reference to FIGS. 1 to 4. The computer programs preferably comprise program code which is stored on a computer readable medium 1400, as illustrated in FIG. 14, which can be loaded and executed by a processing means, processor, or computer 1402 to cause it to perform the methods, respectively, according to embodiments of the present disclosure, preferably as any of the embodiments described above. The computer 1402 and computer program product 1400 can be arranged to execute the program code sequentially where actions of the any of the methods are performed stepwise, or be arranged to perform actions on a real-time basis. The processing means, processor, or computer 1402 is preferably what normally is referred to as an embedded system. Thus, the depicted computer readable medium 1400 and computer 1402 in FIG. 14 should be construed to be for illustrative purposes only to provide understanding of the principle, and not to be construed as any direct illustration of the elements.

Figure 17:
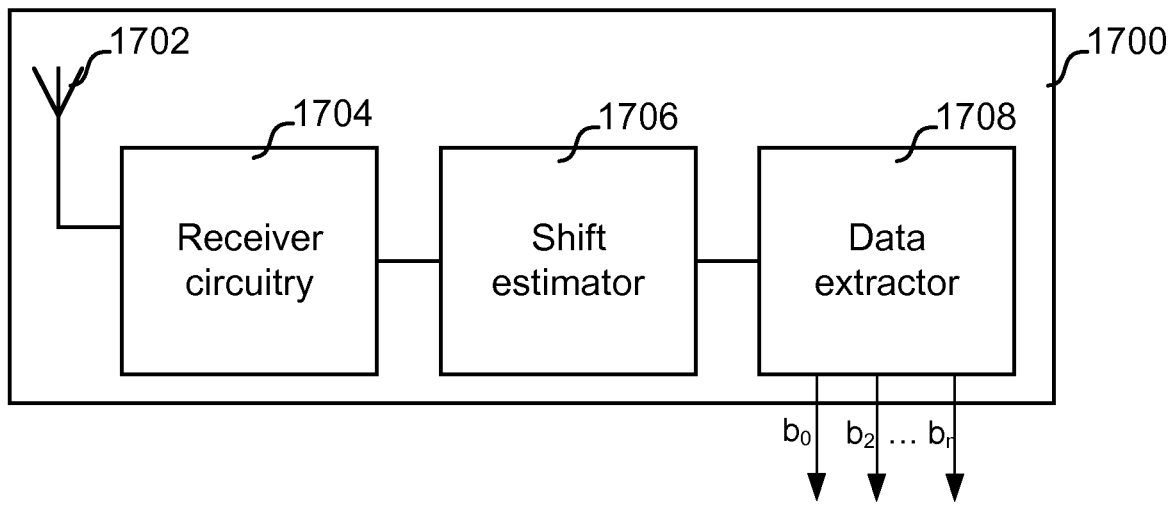
FIG. 17 is a block diagram schematically illustrating a receiver according to an embodiment.

FIG. 17 is a block diagram schematically illustrating a receiver 1700 according to an embodiment. A radio signal is received through an antenna arrangement 1702. The received radio signal is provided to receiver circuitry 1704, which may comprise low-noise amplifier, one or more mixers for converting the radio signal to baseband, etc. The signal processed by the receiver circuitry 1704 is provided to a shift estimator 1706 which is arranged to determine applied phase and cyclic shifts for the signal. Based on the estimated phase and cyclic shifts, a data extractor 1708 converts the estimated shifts to data bits ($b_0 \ldots b_n$), which are provided as an output from the receiver 1700. The data extractor 1708 may be arranged to determine padded bits, and remove them before output, or the padding removal may be performed in later processing of the output data signal.

The receiver 1700 has the task of operating on an amplitude modulated signal, since received signal is piggy-backed on a B-ASK signal as demonstrated above. However, due to applied low data rates, this only limits the performance slightly, and reception of the signal and detection of the data bits should be feasible within reasonable transmission conditions.

Figure 18:
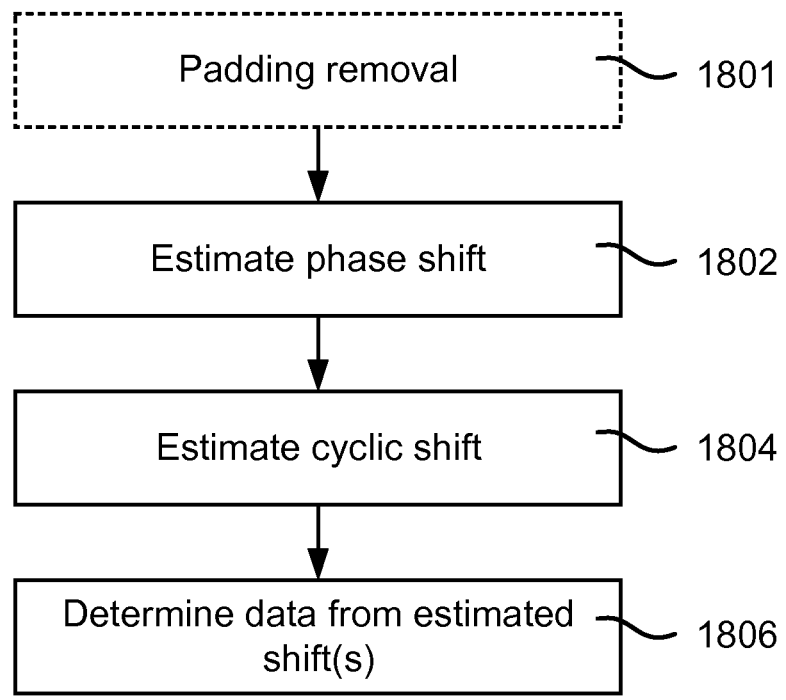
FIG. 18 is a flow chart illustrating a method for a receiver according to an embodiment.

FIG. 18 is a flow chart illustrating a method for a receiver according to an embodiment. The method is adapted for receiving a dual modulated signal, which signal is modulated to carry a first data stream and a second data stream, wherein the first data stream is modulated by scrambling and the second data stream is modulated with binary amplitude shift keying, and the method is arranged to extract at least the first data stream. The method comprises estimating 1802 a phase shift applied to the signal for each high-amplitude part of the signal and estimating 1804 a cyclic shift applied to the same signal. From the estimated shifts, the first data stream it is determined 1806. For the case that the signal comprises padded bits, as discussed above, the method may comprise removing 1801 the padding.

It is to be noted that the order of the actions need not be in the order of the depicted flow chart. For example, padded bits may be removed 1801 after the determination 1806 of bits, and the estimations 1802, 1804 of phase shift and cyclic shift can be made in any order, or simultaneously in a joint estimation.

Figure 20:
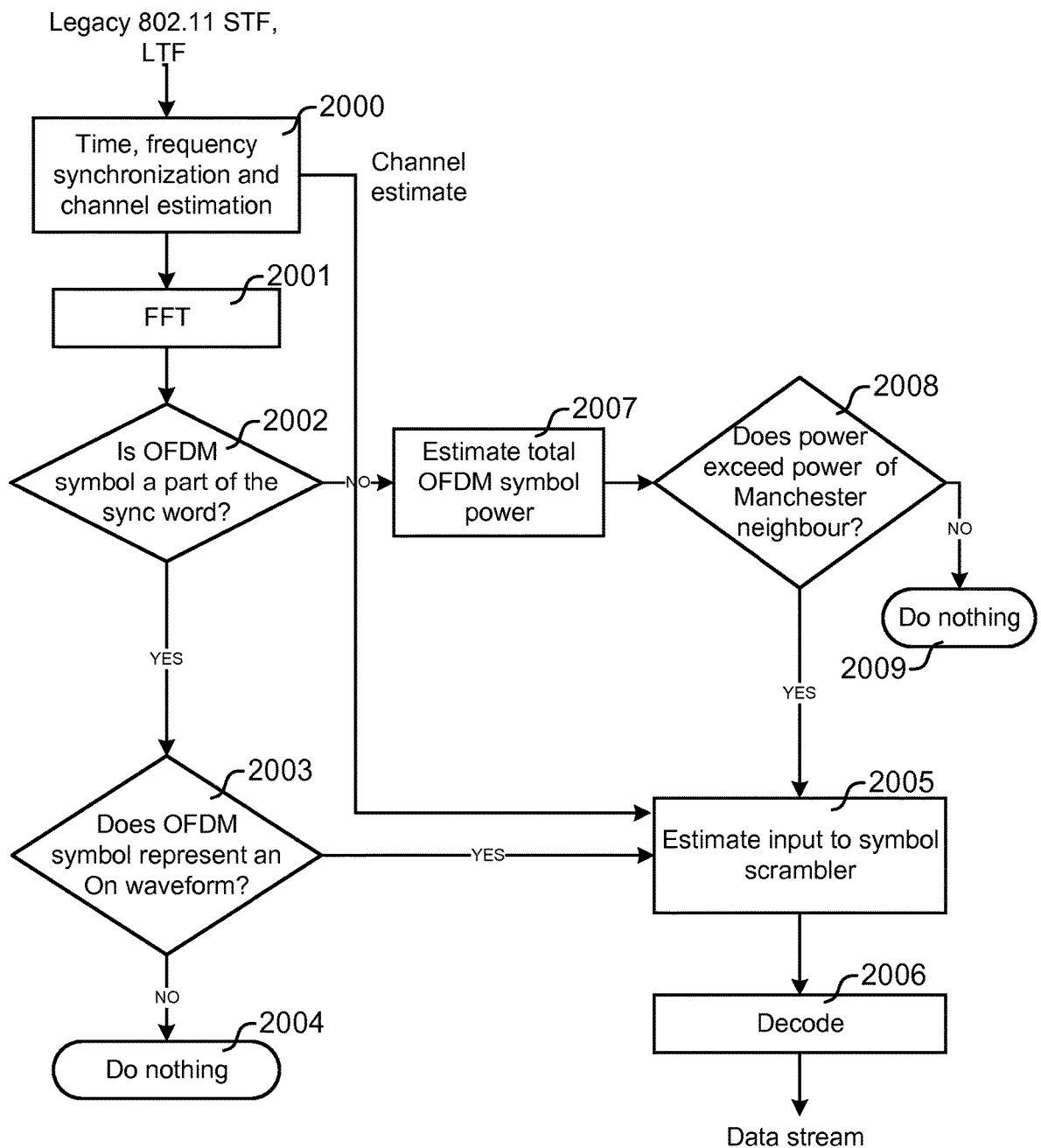
FIG. 20 is a flow chart illustrating a method for a receiver according to an embodiment.

FIG. 20 is a flow chart illustrating a method for a receiver according to an embodiment. In this specific example, it is assumed that a legacy preamble as of an IEEE 802.11 flavour is prepended to the WUP, and is received with its Short Training Field (STF) and Long Training Field (LTF). Based on this, time and frequency synchronisation and channel estimation 2000 is performed. The received signal is transformed 2001 through fast Fourier transform (FFT) to get OFDM symbols and from that it is determined 2002 whether a received OFDM symbol is part of a synchronisation word. If it is so (YES), it is determined 2003 whether the OFDM symbol represents an ON waveform, as demonstrated above. If not (NO) nothing is performed 2004, but if it is (YES), the applied scrambling is estimated 2005, and a data stream is decoded 2006. If it is determined 2002 that a received OFDM symbol is not part of a synchronisation word (NO), a total power or energy of the OFDM symbol is estimated 2007 such that it can be determined 2008 whether the power or energy exceeds a neighbour symbol, i.e. being a Manchester encoded signal over MC-OOK. If it does not (NO), nothing is done 2009 since then it is not likely that it is the kind of signal that is sought, but if it does (YES), an applied scrambling is estimated 2005, i.e. phase shift and cyclic shift, such that a data stream can be decoded 2006.

The estimation 2005 of applied scrambling uses information provided by the time and frequency synchronisation and channel estimation 2000.

The reception procedure depends as demonstrated with reference to FIG. 20 on whether code bits have been piggy-backed on a synchronisation word or a data part, as is performed in step 2002. The reason is that if the code bits are piggy-backed to the synchronisation word, then the receiver knows whether a Manchester pair corresponds to alternative 1 or alternative 2 as illustrated in FIG. 19. On the other hand, when the code bits are piggy backed to data, the receiver must first decide among alternative 1 and alternative 2 in FIG. 19. Once the receiver has decided among the two alternatives, it can determine the scrambling that has been applied to the ON waveform. This in turns determines the value (hard or soft) of the code bit, which is sent to the decoder. Finally, the information bits are decoded 2006.

Most of the blocks of the receiver shown in FIG. 20 can be conveniently implemented in the frequency domain, although it can be performed in analogous way in the time domain.

The following non-limiting examples illustrate how the receiver depicted in FIG. 20 can be implemented. The receiver can perform packet detection, coarse and fine time and frequency synchronization and channel estimation in the same way as is done for OFDM packets, since the WUP starts with a legacy preamble that has been transmitted using OFDM. Suppose that the digital baseband frequency domain received samples corresponding to a Manchester pair are $\{n_k^m; m=1, 2\}$, where the index k labels the subcarrier number and the index m labels the first and second waveforms in a Manchester pair. When the data has been piggy-backed to the synch part of the WUP, the receiver knows whether the ON waveform corresponds to m=1 or to m=2.

However, when the data has been piggy-backed to the data part of the WUP the receiver must determine whether the ON waveform corresponds to m=1 or to m=2. As an example, this can be accomplished by means of an envelope detector, where the estimate m̂ of the value of m is computed as follows:

$$\hat{m} = \underset{m}{\mathrm{argmax}} \sum_k |r_k^m|.$$

Figure 2:
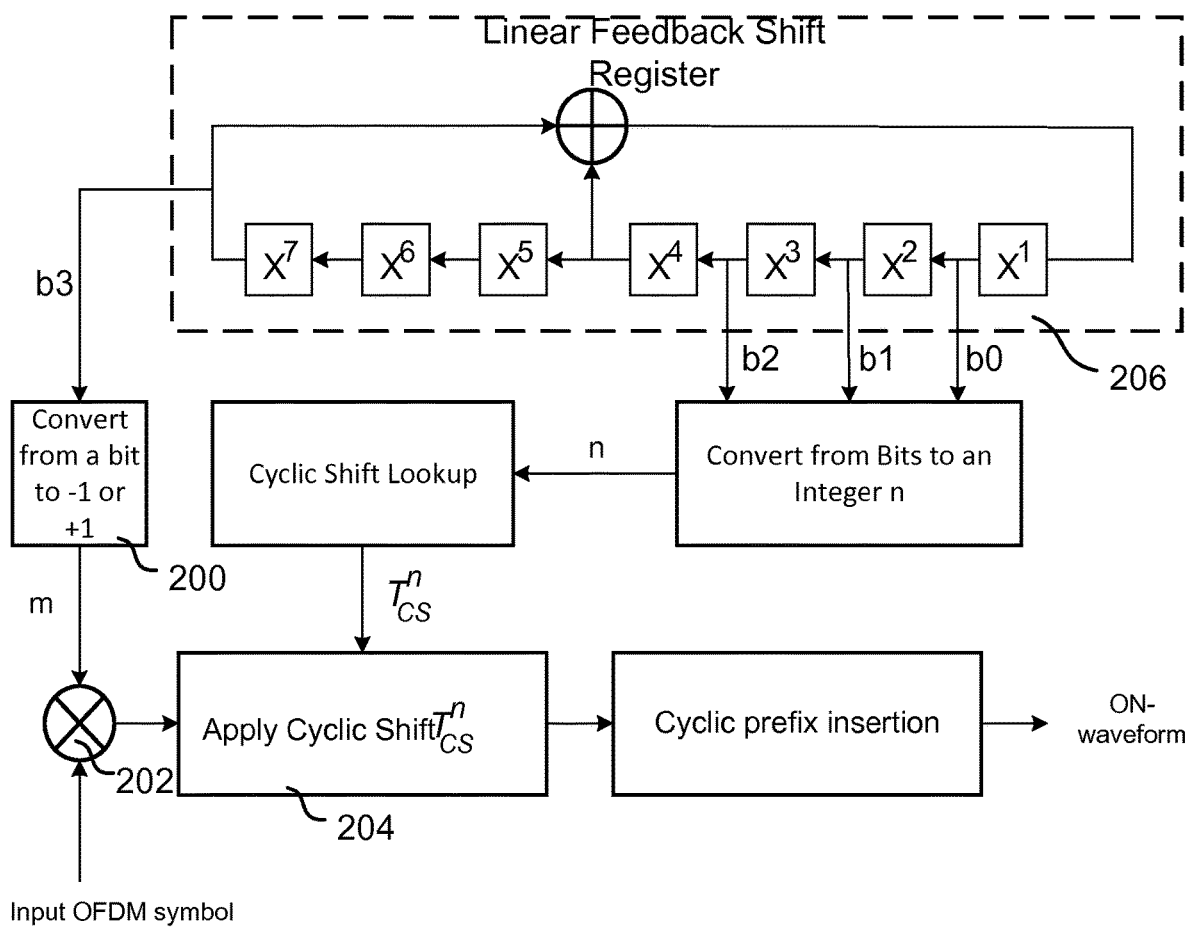
FIG. 2 schematically illustrates a linear feedback shift register for generating input to a symbol scrambler.
Figure 3:
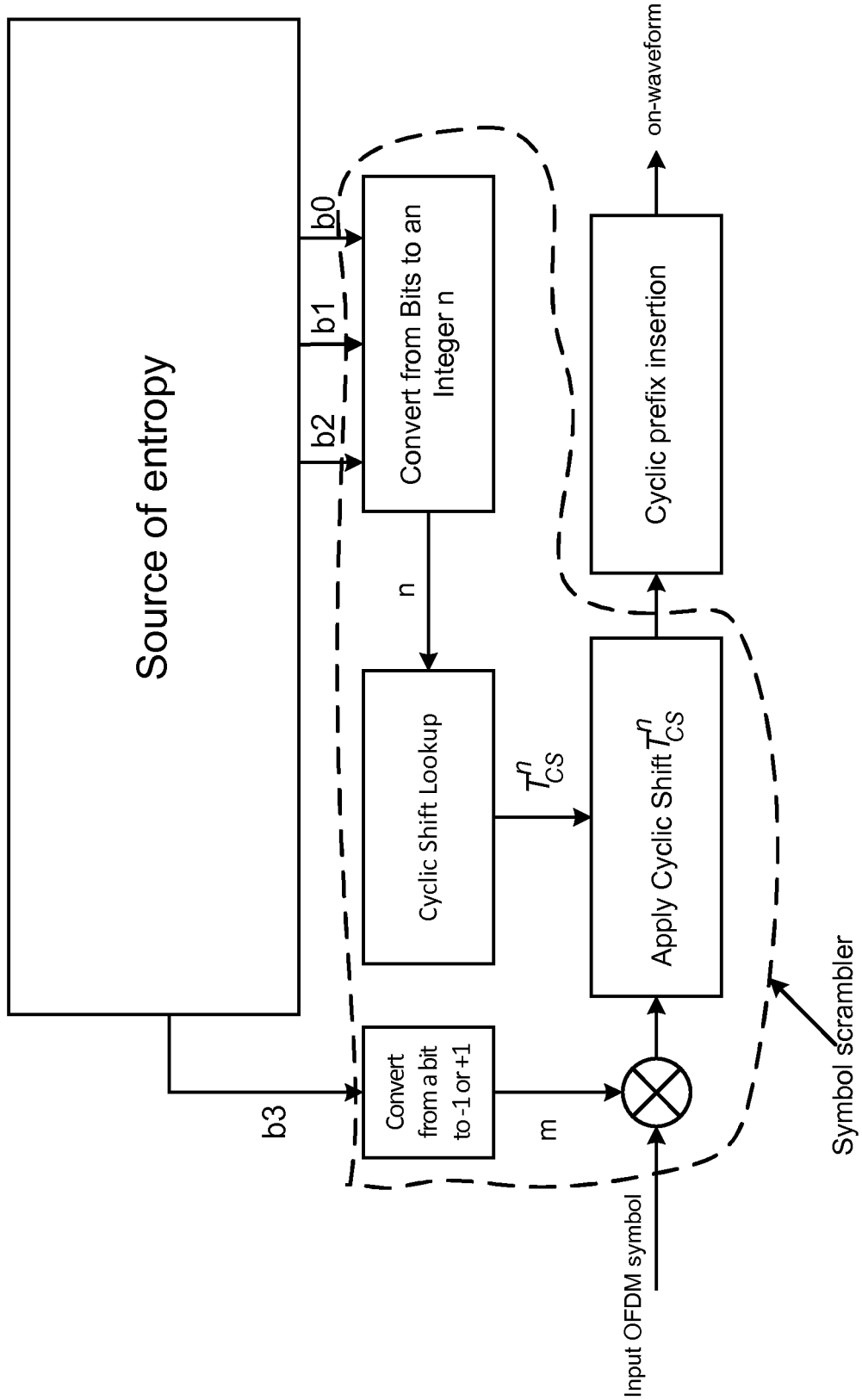
FIG. 3 schematically illustrates a general entropy source for generating input to a symbol scrambler.

Once the receiver has determined the index m̂ that corresponds to the ON waveform in a Manchester pair, it can proceed to estimate the input to the scrambler. The symbol scrambling techniques can be represented in the frequency domain as transformations of the frequency domain symbols. For example, a phase shift of the ON waveform corresponds to a phase shift of the frequency domain symbols, a cyclic shift of the ON waveform corresponds to a rotation of the frequency domain symbols, and complex conjugation of the ON waveform corresponds to complex conjugation of the frequency domain symbols and reversal of the subcarriers. Suppose that the frequency domain symbols corresponding to the unscrambled ON waveform part of an MC-OOK symbol are $\{S_k\}$, where the index k labels the subcarrier number. Each value of the input to the symbol scrambler, say $b_0, \ldots, b_3$ as for example demonstrated with reference to FIG. 6, can be mapped in a one to one fashion to an integer n between 0 and $2^4-1$. Thus, we can label the frequency domain symbols corresponding to the n-th possible scrambling by $\{S_k^n\}$, $n=0, \ldots, 2^4-1$. As an illustration, suppose that the symbol scrambler is as shown in FIG. 2. If b3 b2 b1 b0 is the binary expansion of n and Δf is the subcarrier spacing, then $$S_k^n = (-1)^{b3-1} S_k e^{-j2\pi k \Delta f T_{CS} 4 \cdot b2 + 2 \cdot b1 + b0}$$

for all k. Further, suppose that the estimated channel taps are $\{H_k\}$, where the index k labels the subcarrier number. Then the receiver could estimate the scrambling n̂ that was applied to the ON waveform by matched filtering as follows.

$$\hat{n} = \underset{n}{\mathrm{argmax}} \left| \sum_k r_k^{\hat{m}} H_k^* (S_k^n)^* \right|.$$

Once the scrambling n̂ applied at the transmitter has been determined, the receiver can estimate the code bits $\hat{b}_0, \ldots, \hat{b}_3$ since there is a one to one mapping from integers n to bit sequences $b_0, \ldots, b_3$.

Other types of receivers are possible. For example, when the code bits are piggy backed to the data part of the WUP, it is possible to jointly determine location m̂ of the ON waveform in a Manchester pair and the scrambling applied n̂:

$$(\hat{n}, \hat{m}) = \underset{n,m}{\mathrm{argmax}} \left| \sum_k r_k^m H_k^* (S_k^n)^* \right|.$$

Figure 21:
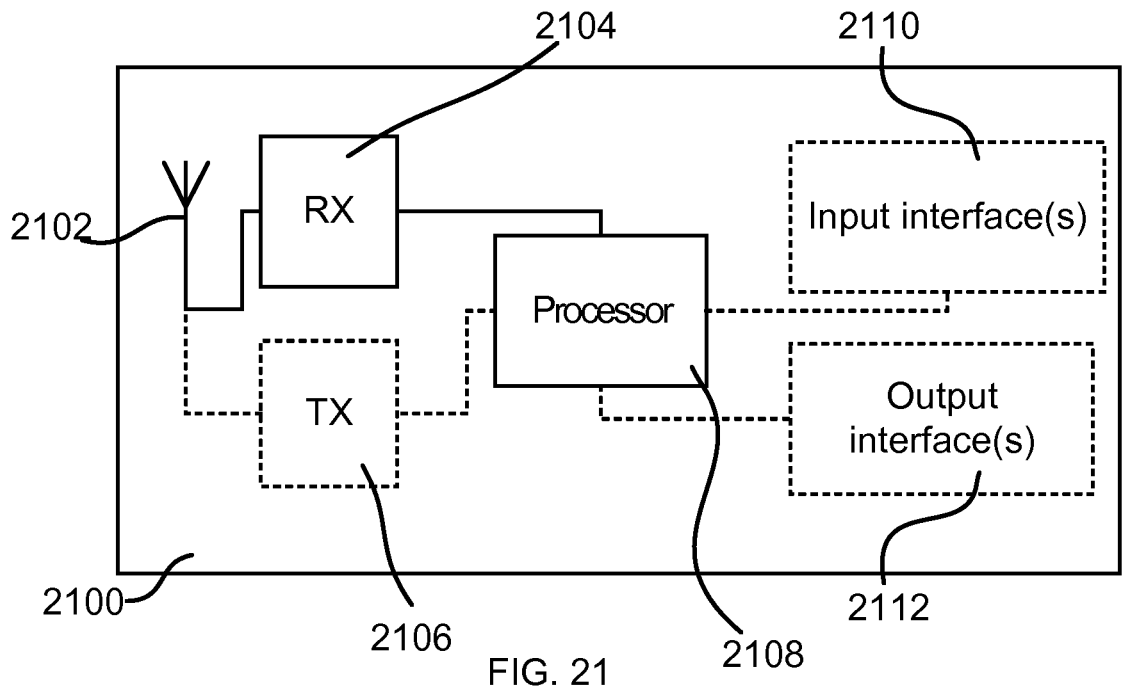
FIG. 21 is a block diagram schematically illustrating a station according to an embodiment.

FIG. 21 is a block diagram schematically illustrating a station 2100 according to an embodiment. The station 2100, which for example may be a building block of another device such as a personal computer, phone, IoT device, etc., comprises an antenna arrangement 2102, a receiver 2104 connected to the antenna arrangement 2102, a transmitter 2106 connected to the antenna arrangement 2102, a processing element 2108 which may comprise one or more circuits, one or more input interfaces 2110 and one or more output interfaces 2112. The interfaces 2110, 2112 can be operator interfaces and/or signal interfaces, e.g. electrical or optical. The station 2100 is arranged to operate, in addition to traditional tasks for this kind of equipment, for receiving an aggregate signal holding e.g. a WUP and also piggy-backed information as demonstrated above. In particular, by the processing element 2108 being arranged to perform the embodiments demonstrated above, the station 2100 is capable of improved spectral efficiency operation when receiving piggy-backed information in e.g. wake-up signals as demonstrated above. The processing element 2108 can also fulfill a multitude of tasks, ranging from signal processing to enable reception and transmission since it is connected to the receiver 2104 and transmitter 2106, executing applications, controlling the interfaces 2110, 2112, etc.

Figure 22:
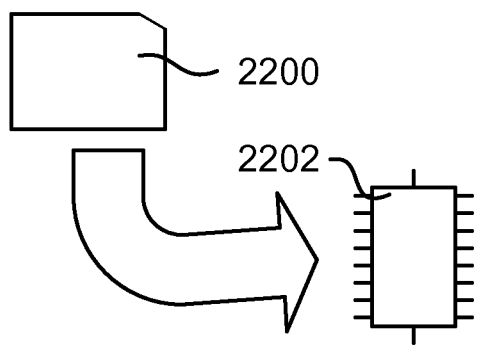
FIG. 22 schematically illustrates a computer-readable medium and a processing device.

The methods according to the present disclosure are suitable for implementation with aid of processing means, such as computers and/or processors, especially for the case where the processing element 2108 demonstrated above comprises a processor handling detection of the piggy-backed data bits from the aggregation of the first and second data streams within the same physical signal as demonstrated above. Therefore, there is provided computer programs, comprising instructions arranged to cause the processing means, processor, or computer to perform the steps of any of the methods according to any of the embodiments described with reference to e.g. FIGS. 18 and 20. The computer programs preferably comprise program code which is stored on a computer readable medium 2200, as illustrated in FIG. 22, which can be loaded and executed by a processing means, processor, or computer 2202 to cause it to perform the methods, respectively, according to embodiments of the present disclosure, preferably as any of the embodiments described above. The computer 2202 and computer program product 2200 can be arranged to execute the program code sequentially where actions of the any of the methods are performed stepwise, or be arranged to perform actions on a real-time basis. The processing means, processor, or computer 2202 is preferably what normally is referred to as an embedded system. Thus, the depicted computer readable medium 2200 and computer 2202 in FIG. 22 should be construed to be for illustrative purposes only to provide understanding of the principle, and not to be construed as any direct illustration of the elements.

The invention claimed is:

1. A method of transmitting a first data stream to a first station and simultaneously transmitting a second data stream to a second station, the method comprising
   modulating a first signal by the first data stream to form a second signal;
   modulating the second signal by the second data stream to form a third signal;
   transmitting the third signal by conversion to a transmission frequency to form a radio frequency signal, amplifying the radio frequency signal and providing the amplified radio frequency signal to an antenna; and
   one of:
      the modulation of the first signal is performed by scrambling of the first signal and the modulation of the second signal is performed by binary amplitude shift keying of the second signal; and
      the modulation of the first signal is performed by binary amplitude shift keying of the first signal and the modulation of the second signal is performed by scrambling of the second signal.

2. The method of claim 1, wherein the binary amplitude shift keying is on-off keying.

3. The method of claim 2, wherein the binary amplitude shift keying includes Manchester coding.

4. The method of claim 1, wherein the first signal is an orthogonal frequency division multiplex signal.

5. The method of claim 1, wherein the scrambling is performed by at least one of a cyclic shift and a phase shift.

6. The method of claim 1, wherein the data stream being modulated by binary amplitude shift keying represents a wake-up signal.

7. The method of claim 1, wherein the data stream modulating the scrambling, at an instance where no data is available to be sent, is padded with a randomized sequence.

8. The method of claim 1, wherein the data stream modulating the scrambling, at an instance where binary amplitude shift keying provides a low amplitude state, is padded with a randomized sequence.

9. A network node arranged to transmit a first data stream to a first station and simultaneously transmit a second data stream to a second station, the network node comprising
a first modulator configured to modulate a first signal by the first data stream to form a second signal;
a second modulator configured to modulate the second signal by the second data stream to form a third signal;
a transmitter configured to transmit the third signal by conversion to a transmission frequency to form a radio frequency signal, amplifying the radio frequency signal and providing the amplified radio frequency signal to an antenna; and
one of:
the first modulator is a scrambling modulator configured to modulate the first signal by scrambling of the first signal and the second modulator is a binary amplitude shift keying modulator configured to modulate the second by binary amplitude shift keying of the second signal; and
the first modulator is a binary amplitude shift keying modulator configured to modulate the first signal by binary amplitude shift keying the first signal and the second modulator is a scrambling modulator configured to modulate the second signal by scrambling the second signal.

10. The network node of claim 9, wherein the binary amplitude shift keying is on-off keying.

11. The network node of claim 10, wherein the binary amplitude shift keying includes Manchester coding.

12. The network node of claim 9, comprising a waveform generator arranged to generate the first signal by inverse fast Fourier transform, wherein the first signal is an orthogonal frequency division multiplex signal.

13. The network node of claim 9, wherein the scrambling includes at least one of a cyclic shift and a phase shift.

14. The network node of claim 9, wherein the data stream being modulated by binary amplitude shift keying represents a wake-up signal.

15. The network node of claim 9, comprising a sequence generator arranged to generate a randomized sequence, wherein the data stream modulating the scrambling, at an instance where no data is available to be sent, is padded with the randomized sequence.

16. The network node of claim 9, comprising a sequence generator arranged to generate a randomized sequence, wherein the data stream modulating the scrambling, at an instance where binary amplitude shift keying provides a low amplitude state, is padded with a randomized sequence.

17. A method of receiving a dual modulated signal, which signal is modulated to carry a first data stream and a second data stream, the first data stream being modulated by scrambling and the second data stream being modulated with binary amplitude shift keying, and the method is arranged to extract at least the first data stream, the method comprising:
estimating a shift applied to the signal for each high-amplitude part of the signal; and
determining the first data stream from the estimated shift.

18. The method of claim 17, wherein the estimated shift comprises at least one of phase shift and cyclic shift.

19. The method of claim 17, wherein the binary amplitude shift keying is on-off keying.

20. The method of claim 19, wherein the binary amplitude shift keying includes Manchester coding.

21. The method of claim 20, wherein the determination of the first data stream from the estimated shift is based on a position of the high-amplitude part in a Manchester pair.

22. A receiver of a dual modulated signal, which signal is modulated to carry a first data stream and a second data stream, the first data stream being modulated by scrambling and the second data stream being modulated with binary amplitude shift keying, and the receiver is arranged to extract at least the first data stream, the receiver comprising:
receiver circuitry configured to receive the signal from a receiver antenna;
a shift estimator configured to estimate a shift applied to the signal for each high-amplitude part of the signal; and
a data extractor configured to determine the first data stream from the estimated shift.

23. The receiver of claim 22, wherein the estimated shift comprises at least one of phase shift and cyclic shift.

24. The receiver of claim 22, wherein the binary amplitude shift keying is on-off keying.

25. The receiver of claim 24, wherein the binary amplitude shift keying includes Manchester coding.

26. The receiver of claim 25, wherein the determination of the first data stream from the estimated shift is based on a position of the high-amplitude part in a Manchester pair.

\* \* \* \* \*